United States Patent
Naka

(10) Patent No.: US 7,629,782 B2
(45) Date of Patent: Dec. 8, 2009

(54) SWITCHING POWER CIRCUIT AND POWER CONTROL METHOD

(75) Inventor: Toshiyuki Naka, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 11/742,895

(22) Filed: May 1, 2007

(65) Prior Publication Data

US 2007/0257653 A1   Nov. 8, 2007

(30) Foreign Application Priority Data

May 2, 2006  (JP) ............................ P2006-128213

(51) Int. Cl.
  *G05F 1/40* (2006.01)
  *G05F 1/56* (2006.01)
(52) U.S. Cl. ...................... 323/271; 323/283
(58) Field of Classification Search ................. 323/222, 323/223, 225, 268, 271, 282, 283–285
  See application file for complete search history.

(56) References Cited

U.S. PATENT DOCUMENTS

| | | | |
|---|---|---|---|
| 6,956,360 B2 | 10/2005 | Matsuura et al. | |
| 6,958,592 B2 * | 10/2005 | Chapuis | 323/246 |
| 7,148,669 B2 * | 12/2006 | Maksimovic et al. | 323/283 |
| 7,456,620 B2 * | 11/2008 | Maksimovic et al. | 323/283 |
| 2005/0057238 A1 | 3/2005 | Yoshida | |
| 2007/0013351 A1 | 1/2007 | Naka et al. | |

FOREIGN PATENT DOCUMENTS

JP  2004-304872  10/2004

OTHER PUBLICATIONS

U.S. Appl. No. 12/351,426, filed Jan. 9, 2009, Nakamura et al.

* cited by examiner

*Primary Examiner*—Matthew V Nguyen
(74) *Attorney, Agent, or Firm*—Oblon, Spivak, McClelland, Maier & Neustadt, L.L.P.

(57) ABSTRACT

A switching power circuit having a counter which periodically counts a value between a first value and a second value, a determining unit which continuously determines a third value between the first value and the second value, based on a voltage difference between an output voltage and a reference voltage, a driving unit which alternately switches a first switching element and a second switching element, base on a small and large relation between a counting value of the counter and the third value, and a control unit which resets the counting value of the counter to the first value, based on the voltage difference or a current value at the second switching element.

19 Claims, 16 Drawing Sheets

SWITCHING POWER CIRCUIT AND POWER CONTROL METHOD

CROSS-REFERENCE TO RELATED APPLICATIONS

This application is based upon and claims the benefit of priority from the prior Japanese Patent Application No. 2006-128213, filed on May 2, 2006; the entire contents of which are incorporated herein by reference.

BACKGROUND OF THE INVENTION

1. Field of the Invention

This invention relates to a switching power circuit and power control method.

2. Description of the Related Art

A switching power circuit such as a DC-DC converter generates a desired Voltage from a power source Voltage by controlling a switching element. At this time, the switching element is controlled very often by DPWM (Digital Pulse Width Modulation). In the DPWM control, a counter is used (for example, JP-A 2004-304872 (KOKAI)). This is because the construction of circuit is relatively simple and the DPWM control can be realized relatively at low cost.

However, a DC-DC converter controlled by DPWM is efficient at heavy load, but is inefficient at light load. In contrast, a DC-DC converter controlled by DPFM (Digital Pulse Frequency Modulation) is efficient at light load, but is inefficient at heavy load. Owing to this, it is desirable that the switching of the DPWM control and the DPFM control would be possible. Now, when a counter system is used in the DPWM control, switching frequency is determined by time of which all bits of counter come from 0 to 1. Thus, when the counter is used, it is difficult to change the switching frequency, that is, to coexist the DPWM control and the DPFM control together.

SUMMARY OF THE INVENTION

A switching power circuit of a scope of the invention has a counter which periodically counts a value between a first value and a second value, a determining unit which continuously determines a third value between the first value and the second value, based on a voltage difference between an output voltage and a reference voltage, a driving unit which alternately switches a first switching element and a second switching element, based on a small and large relation between a counting value of the counter and the third value, and a control unit which resets the counting value of the counter to the first value, based on the voltage difference or a current value at the second switching element.

A power control method of another scope of the invention has periodically counting a value between a first value and a second value by a counter, continuously determining a third value between the first value and the second value, based on a voltage difference between an output voltage and a reference voltage, alternately switching a first switching element and a second switching element, based on a small and large relation between a counting value of the counter and the third value, and resetting a counting value of the counter to the first value, based on the voltage difference or a current value at the second switching element.

DESCRIPTION OF THE EMBODIMENTS

Figure 1:
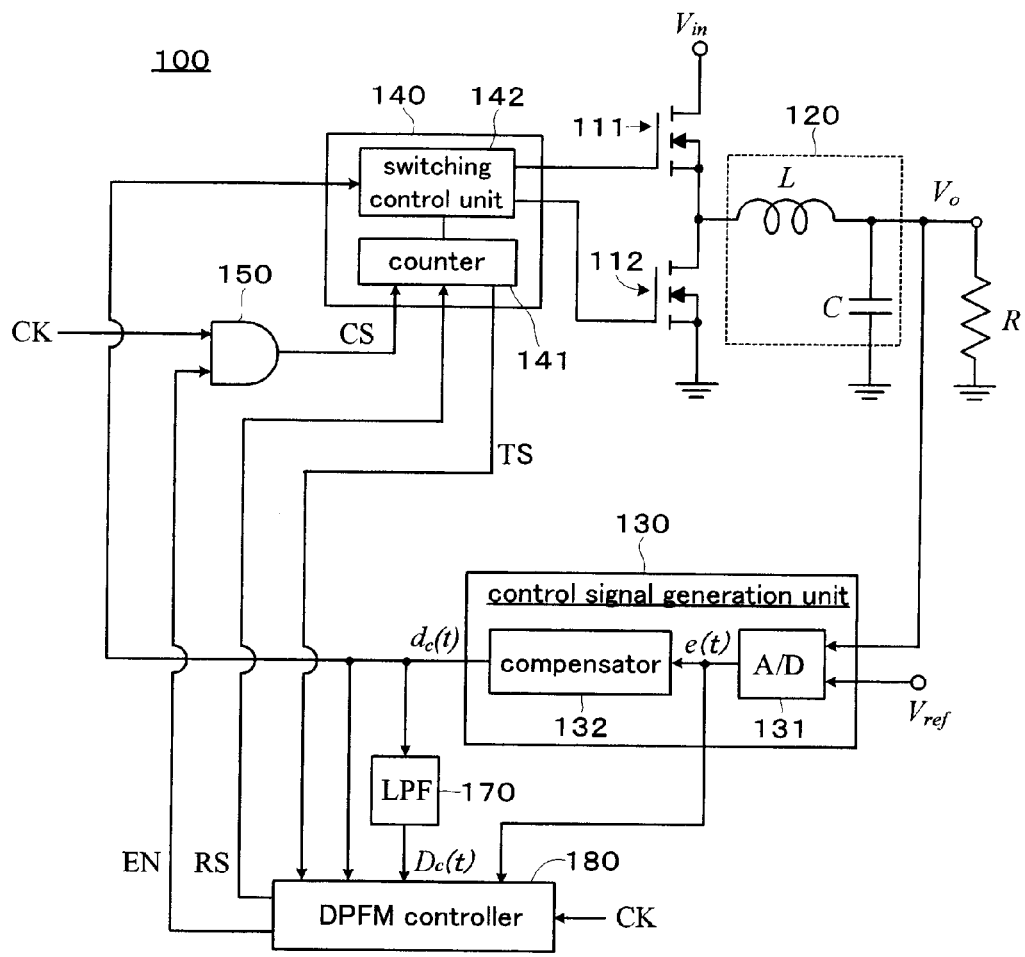
FIG. 1 is a circuit diagram showing a DC-DC converter according to the first embodiment of the invention.

Below, we will describe embodiments of the invention in detail while referring to the drawings.

First Embodiment

FIG. 1 is a circuit diagram showing a DC-DC converter (buck converter) 100 according to the first embodiment of the invention.

The DC-DC converter 100 is a power circuit in which a DC input voltage Vin is converted to a DC output voltage Vo. This output voltage Vo is used for driving a load R. This load R is, for example, electronic equipments of computer and the like, or construction elements thereof (as an example, CPU, DSP), and is expressed as a resistance on the circuit. Here, an output voltage Vo(t) is controlled based on a reference signal Vref. That is, by the reference signal Vref having low power, the output voltage Vo having high power is controlled, and is applied to the load R. As described later, switching between the DPWM control and the DPFM control is conducted by the DC-DC converter 100 according to small or large in load.

The DC-DC converter 100 comprises an FET (Field Effect Transistor) 111, 112, smoothing circuit 120, control signal generation unit 130, DPWM (Digital Pulse Width Modulation) controller 140, AND computing element 150, LPF (Low Pass Filter) 170, DPFM (Digital Pulse Frequency Modulation) controller 180. These construction elements can be suitably integrated. For example, the control signal generation unit 130, DPWM controller 140, AND computing element 150, LPF 170, and DPFM controller 180 can be unitarily constructed as an integrated circuit.

The FET (Field Effect Transistor) 111 and 112 are switching elements which are connected to the input voltage Vin in series with each other. The FETs 111 and 112 are classified to a high-voltage side (High-side) and a low voltage side (Low-side) according to the relation of location relative to the power source of input voltage Vin.

When the FET 111 at high side is in ON state and the FET 112 at low side is in Off state, current flows into the smoothing circuit 120 from the power source of the input voltage Vin. On the other hand, when the FET 111 at high side is in OFF state and the FET 112 at low side is in ON state, current flows out from the smoothing circuit 120 to the ground. Namely, by switching the ON/OFF state at FETs 111 and 112, the current which flows into or flows out from the smoothing circuit can be controlled. Owing to this control, it becomes possible to regulate the output voltage Vo. The FETs 111 and 112 are controlled by the DPWM controller 140. The detail thereof will be described later.

The smoothing circuit 120 comprises a coil L and a condenser C, and makes smooth pulsating currents, which are inputted due to switching control, and converts to the direct current. The smoothing circuit 120 is connected between the FET 111 at high voltage side and the FET 112 at low voltage side. As a result, an output voltage Vo is lower than an input voltage Vin. Namely, the DC-DC converter 100 is a step-down type. As described later, by changing the locations of the FETs 111 and 112, a step-up type DC-DC converter can be constructed.

The control signal generation unit 130 has a differentiator 131 and a compensator 132, and generates control signals dc(t) for controlling the DPWM controller 140. The control signal generation unit 130 functions as a determining unit which continuously determines values located between the minimum counting value and the maximum counting value of a counter 141 described later.

The differentiator 131 generates differential signal e(t) which represents the difference between the output voltage Vo(t) and the reference voltage Vref. This differential signal e(t) represents an error of the output voltage Vo to the reference voltage Vref. Thus, it may be called as an error signal. That is, as shown in the following expression (1), the differentiator 131 A/D-converts the difference between the output voltage Vo(t) and the reference voltage Vref and outputs the result as a differential signal e(t).

$$e(t)=Vo(t)-Vref \qquad \text{Expression (1)}$$

The compensator 132 generates a control signal dc(t) based on the differential signal e(t). For generating a control signal Dc, PID (proportional, integral, and derivative) control and PI (proportional and integral) control can be used.

In the PID control, as shown in the following expression (2), a control signal dc(t) is generated from three elements of a differential signal e (t), a summation value thereof (integration) $\Sigma e(t)$, and a differential value (differentiation) $\Delta e(t)$. In the PI control, as shown in the following expression (3), a control signal dc(t) is generated from two elements of a differential signal e(t), and a summation value thereof (integration) $\Sigma e(t)$.

$$dc(t)=A1 \cdot e(t)+B1 \cdot \Sigma e(t)+C1 \cdot \Delta e(t) \qquad \text{Expression (2)}$$

$$dc(t)=A2 \cdot e(t)+B2 \cdot \Sigma e(t) \qquad \text{Expression (3)}$$

$$\Delta e(t)=e(t)-e(t-\Delta t)$$

A1-C1, A2, B2: constant, t: time, $\Delta t$: time difference (is the same as a clock interval, described later).

In general PID control and PI control, the integration and differentiation of a differential signal e(t) are used. In this embodiment, since the difference signal e(t) is discretely outputted from the differentiator 131 corresponding to clock signal CK, a summation and a difference are used instead of integration and differentiation. Further, constants A1 to C1, A2, and B2 can be memorized as a table in the control signal generation unit 130.

Figure 2:
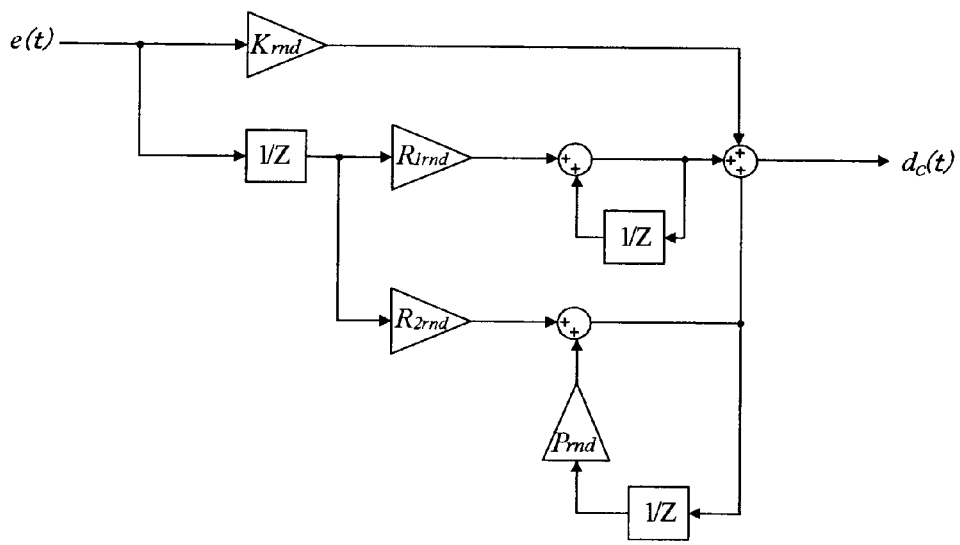
FIG. 2 is a block diagram showing an example of construction of a compensator.

FIG. 2 is a block diagram showing an example of construction of the differentiator 132. Here, a control signal dc(t) is generated with the PI control. A content of control is shown in the following expression (4).

$$dc(t) = Krnd \cdot e(t) + \qquad \text{Expression (4)}$$
$$R1rnd \cdot (\Sigma e(t) + \Sigma\Sigma e(t) +$$
$$R2rnd \cdot (\Sigma e(t) + Prnd \cdot \Sigma\Sigma e(t))$$

Namely, in the block diagram of FIG. 2, the PI control considering up to twice sum $\Sigma\Sigma e(t)$ of a differential signal e(t) is shown.

A control signal dc(t) generated in the compensator 132 shows a value of counting range (from minimum counting value to maximum counting value) of a counter 141 described later. This expression is allowed to be either direct or indirect. Namely, it is unnecessary that the control signal dc(t) expresses directly the value itself within the counting range. If it is possible to make a correspondence between them, any expression form would be allowable. Below, we will use dc(t) as this control signal itself and further as a value expressed control signal. A Dc(t) described later is also used in the same way.

As described later, when a value dc(t) is consistent with a counting value Nc of counter 141, the ON/OFF of FETs 111 and 112 is switched. This means that the control signal dc(t) corresponds to the ON-time of the FET 111 at high voltage side. Further at the time of DPWM control, the control signal dc(t) corresponds to the time ratio of FETs 111 and 112 (duty ratio=ON time of FET 111 at high voltage side/total driving time).

The DPWM controller 140 has a counter 141 and a switching control unit 142 and controls the DPWM.

The counter 141 integrates repeatedly (periodically) signal CS between the minimum counting value (for example, 0) and the maximum counting value (for example, $2^n-1$, n: natural number). Namely, when a counting value Nc of counter 141 reaches to the maximum counting value, the counting value Nc is reset to the minimum counting value, and the counting is continued. The signal CS is generated by adding a clock signal CK and enable signal EN with the AND computing element 150. When the enable signal EN is in H state, the H/L state of signal CS becomes the same as the H/L state of clock signal CK. And when the enable signal EN is in a L state, the H/L state of signal CS becomes always in L state, without relation to the H/L state of clock signal CK. That is, the enable signal EN is a signal for controlling the start or stop of the counting of clock signal CK due to the counter 141.

The AND computing element 150 controls the start/stop of counting of clock signal CK with the counter 141, by the AND computing of the clock signal CK and the enable signal EN.

Further, it is possible to control the start/stop of counting of clock signal CK with the counter 141, by using an OR computing element instead of the AND computing element 150. In this case, an H/L of the enable signal EN is reversed (H active (High Active)). Concretely, it will be described in the second embodiment. The H active means that when the enable signal EN is in the H state, the counting with the counter 141 is stopped. An L active means that when the enable signal EN is in the L state, the counting with the counter 141 is stopped. Embodiments later are similar to the above.

The counter 141 is reset by a reset signal RS from the DPFM controller 180. Namely, when the reset signal RS comes to H, a counting value Nc of the counter 141 is set to a minimum counting value and the counting is restarted. At this time, driving is switched from the FET 112 at low voltage side to the FET 111 at high voltage side. By controlling the ON time of the FET 112 at low voltage side, the DPFM control is carried out. When a counting value Nc is conformed with a value dc(t), the counter 141 outputs a switching signal TS to the DPFM controller 180, to use for controlling in the DPFM controller 180.

A switching control unit 142, using the counting value Nc and control signal dc, controls the switching operation between the FET 111 and FET 112. Namely, the switching control unit 142 functions as a driving unit which alternatively change over (switching) the first and second switching elements. When a counting value Nc of the counter 141 is smaller than the value dc, the switching control unit 142 controls the FET 111 at high voltage side to be in state of ON and the FET 112 at low voltage side to be in state of OFF. At this time, an input voltage Vin is applied to the smoothing circuit 120. When a counting value Nc of the counter 141 is more than or equal to the value dc, the switching control unit 142 makes the FET 111 at high voltage side to be in state of OFF and the FET 112 at low voltage side to be in state of ON. At this time, the smoothing circuit 120 is connected to the ground.

LPF (Low Pass Filter) 170 has a cut-off frequency f c, and is a filter which passes through low frequency components of the control signal dc(t). Due to pass through the LPF, the control signal dc is converted to the control signal Dc. That is, by removing the high frequency components from the control signal dc(t), LPF 170 generates a control signal Dc(t) which is averaged (smoothed). The LPF 170 functions as an averaging unit which averages the third value and generates the fourth value.

DPFM controller 180, based on control signal dc(t), Dc(t), differential signal e(t), switching signal TS, and clock signal CK, generates a reset signal RS and enable signal EN. Here, it is possible to use only either of the control signal dc(t) and the Dc(t). As described above, the reset signal RS is a signal which adjusts the ON time of FET 112 at low voltage side, by resetting the counter 141. As the result, the DPFM control is carried out. The DPFM controller 180 functions as a control unit which resets the counting value of counter 141 to the minimum counting value, a count stop unit which stops the counting with the counter 141, and a count restart unit which restarts the counting with the counter 141.

As described above, the enable signal EN is a signal for controlling the execution or stop of counting of clock signal CK by the counter 141. By stopping the counter 141, the consumption of power in the counter 141 is decreased. It will be described later that the detail of generations of the reset signal RS and the enable signal EN.

(Operation of DC-DC Converter 100)

Figure 3:
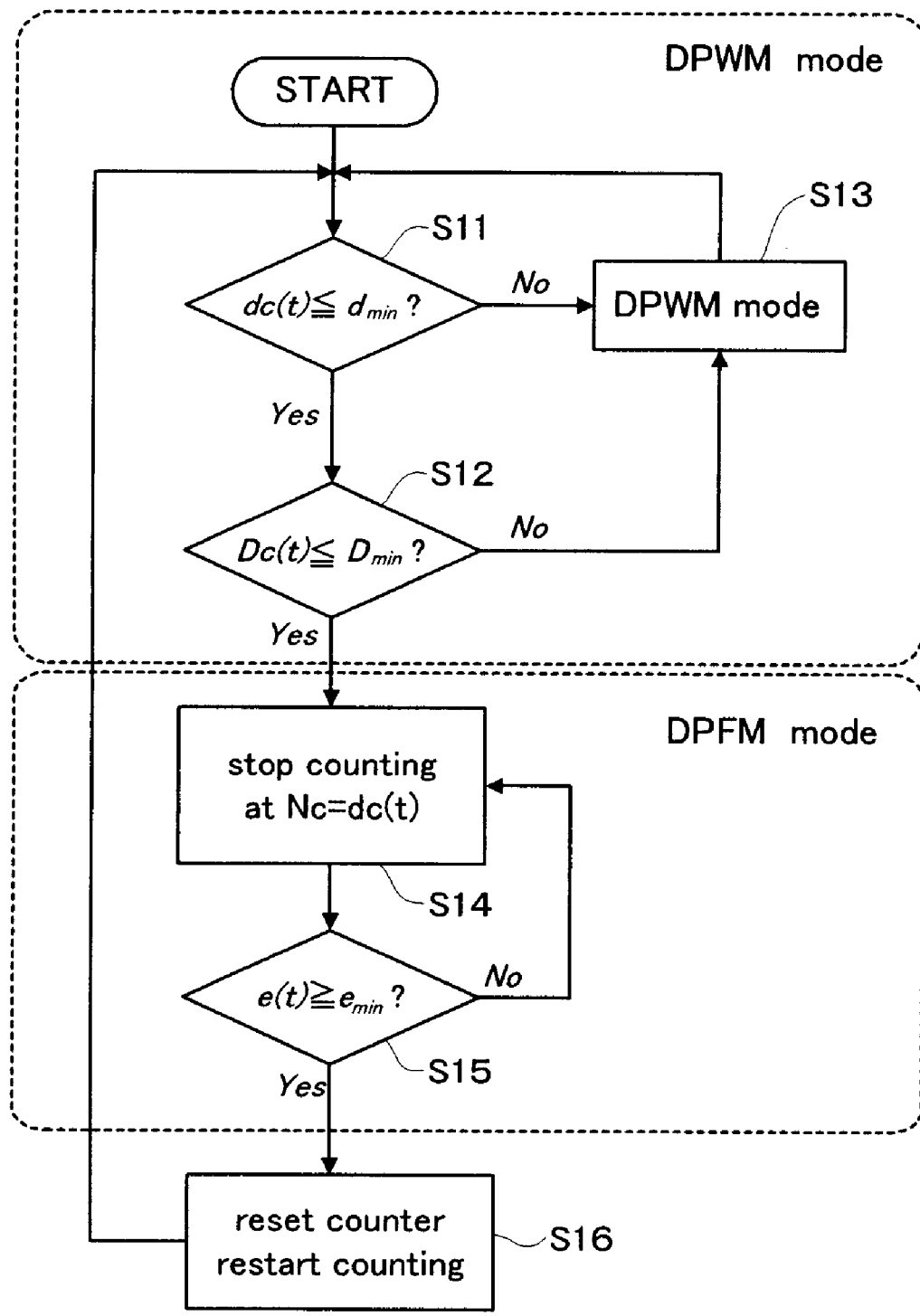
FIG. 3 is a flow chart showing an operation procedure of the DC-DC converter according to the first embodiment of the invention.
Figure 4:
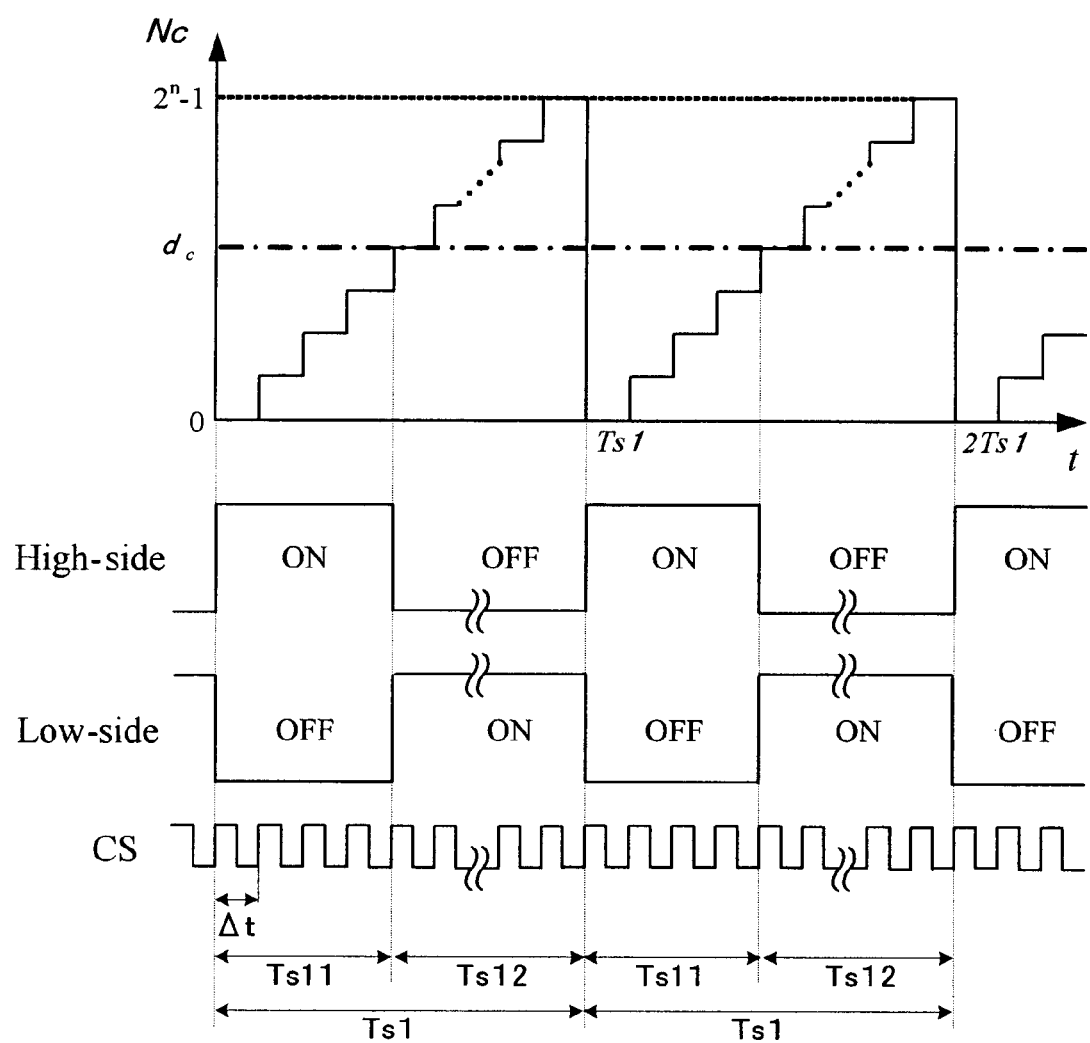
FIG. 4 is a diagram showing an operating wave form at the DPWM control.
Figure 5:
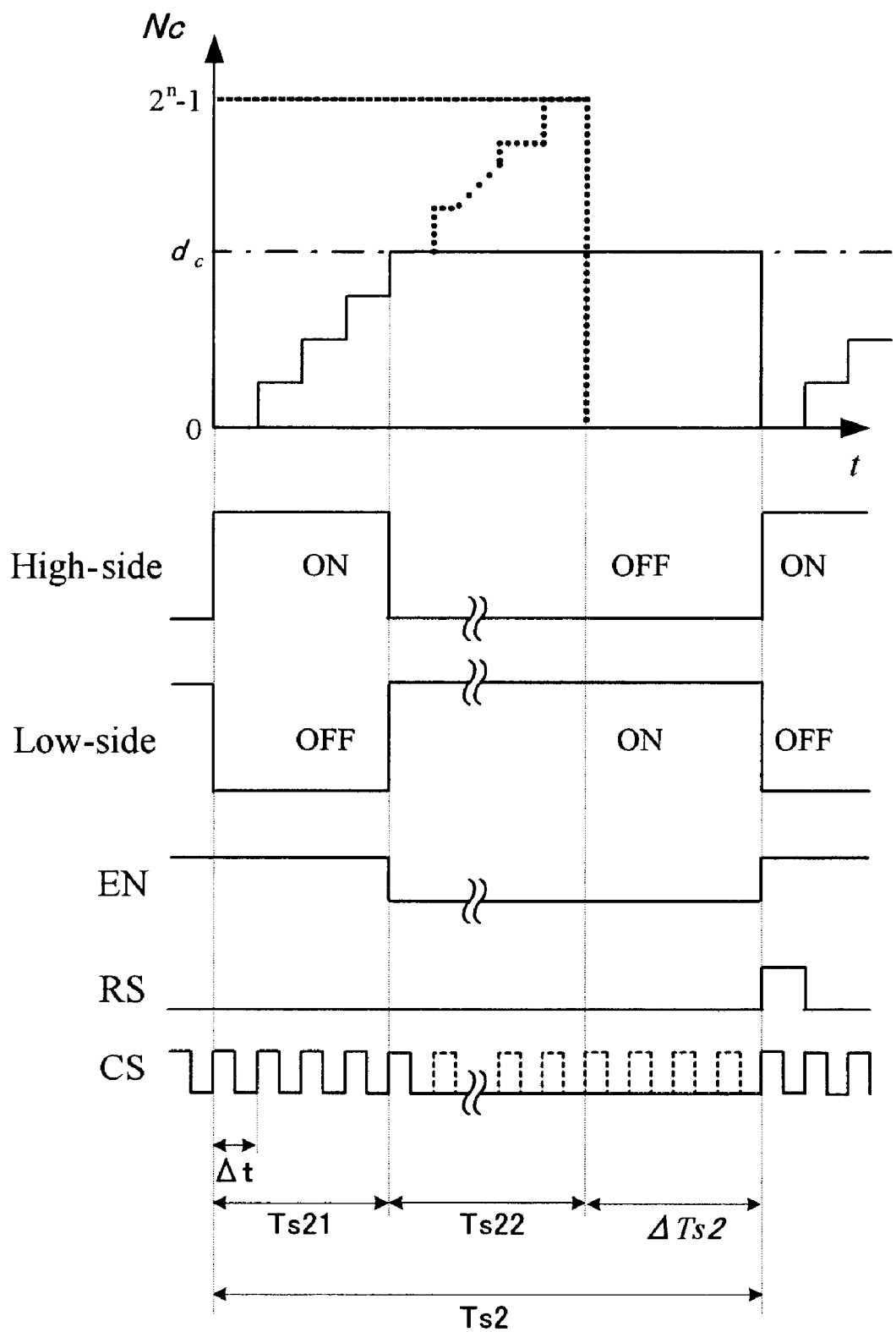
FIG. 5 is a diagram showing an operating wave form at the DPFM control.

FIG. 3 is a flow chart showing the operation processes of the DC-DC converter 100, particularly, the DPFM controller 180. Further, FIGS. 4 and 5 show the operation wave diagrams at the time of DPWM control and at the time of DPFM control, respectively.

(1) Judgment of Condition Based on Values dc(t) and Dc(t) (Step S11, S12)

Judges that DPFM controller 180 satisfies or not the condition that respective values of dc(t) and DC(t) are not more than respective reference values dmin and Dmin. This is for switching between the DPWN control and the DPFM control depending on heavy load or light load.

(2) When the Condition is not Satisfied (DPWM Mode)

When either of steps S11 and S12 does not satisfy the condition, the DC-DC converter 100 comes to in state of DPWM control (DPWM mode) (step S13). In this state, the enable signal EN is always in H state, and the reset signal RS is always in L state.

As shown in FIG. 4, the counter 141 integrates clock signals CK, and the counting value Nc periodically changes between the minimum counting value Ncmin (=0) and the maximum counting value Ncmax (=$2^n-1$).

Based on the small and large relation of the counting value Nc and value dc of the counter 141, the switching control unit 142 controls the ON/OFF state of FET 111 and FET 112. Namely, when a counting value Nc of the counter 141 is smaller than the dc value, the FET 111 at high voltage side comes to the ON state. When a counting value Nc of the counter 141 is more than the dc value, the FET 112 at low voltage side comes to the ON state.

As described above, the FET 111 and FET 112 come to the ON state, alternately. Respective ON periods Ts11 and Ts12 of the FET 111 and the FET 112 and total period Ts1 is determined by the following expression (11).

$$Ts11 = (dc - Ncmin) \cdot \Delta t = dc \cdot \Delta t \quad (11)$$

$$Ts12 = (Ncmax - dc + 1) \cdot \Delta t = (2^n - dc) \cdot \Delta t$$

$$Ts1 = (Ncmax - Ncmin) \cdot \Delta t = 2^n \cdot \Delta t$$

$\Delta t$: clock interval ($\Delta t=1/ft$ (clock frequency))

Further, the time ratio (Duty ratio) Rd is determined from the value dc by the following expression (12).

$$Rd=Ts11/Ts1=dc/2^n \quad (12)$$

As described above, in the DPWM mode, the period Ts1 is constant, and the time ratio Rd is controlled by the control signal dc(t).

(3) When the Condition is Satisfied (DPWM Mode)

Both conditions of steps S11 and S12 are satisfied, the DC-DC converter 100 comes to the DPFM control state (DPFM mode) (step S14, S15).

1) Also in the DPFM mode, the switching control unit 142 controls the ON/OFF state of the FET 111 and FET 112.

Namely, when the counting value Nc of the counter 141 is smaller than the value dc, the FET 111 at high voltage side comes to ON state. When the counting value Nc of the counter 141 is more than the value dc, the FET 112 at low voltage side comes to ON state.

Namely, the ON period Ts21 of FET 111 at the DPFM mode is equal to the ON period Ts11 of FET 111 at the DPWM mode.

$$Ts21=Ts11 \tag{13}$$

2) At the DPFM mode, when the counting value Nc of the counter 141 is equal to the value dc, the counting with the counter 141 is stopped (step S14). This because the consumption of power at the counter 141 is decreased. Namely, by making the enable signal EN to the L state, regardless of the clock signal CK, the signal CS which is inputted in the counter 141 always takes the L state. That the counting value Nc of counter 141 is equal to the value dc can be judged by the switching signal TS. At this time, by the switching control unit 142, The FET 112 at low voltage side comes to the ON state. Even if the counting with the counter 141 is stopped, this state continues as it is.

3) Difference e(t) is judged with regard to that the value is more than or equal to the reference value emin or not (step S15). This is for determining the time of switching between FET 111 and FET 112.

When the difference e(t) is not more than the reference value emin, the ON state of the FET 112 at low voltage side is continued (step 14). This is because a larger value of the difference signal e(t) means an excess of power supply to the smoothing circuit 120.

When the difference e(t) is more than the reference value emin, the counter 141 is reset and the counting is restarted (step S16). Namely, the reset signal RS comes to H state for one clock (generation of reset pulse). Further, the enable signal EN is set in H state together. Here, a clock signal CK is used for generating the reset pulse.

As the counting value Nc of counter 141 is reset to a minimum counting value, the switching control unit 142 makes the FET 111 to ON state in principal (exclude the case that a minimum counting value of counter 141 is equal to an expression value of control signal dc). This means the end of one period Ts2 in DPFM mode. Namely, time T22 which continues the ON state at FET 112 is a period from the time that a counting value of counter 141 comes equal to the value dc to the time that the difference e(t) comes smaller than the reference value emin.

This ON period Ts22 at low voltage side at the time of DPFM controlling is not directly affected by the counting with the counter 141. Due to this, this time 21 changes from the time Ts11 at low voltage side at the time of DPWM control. The difference between the time Ts22 and the time Ts12 is a switching time difference ΔTs.

$$Ts22=Ts12+\Delta Ts2$$

$$Ts2=Ts1+\Delta Ts2 \tag{14}$$

Thereafter, the counting of clock signal CK by the counter 141 is restarted, and the step returns to the step S11. Then, the use of either DPWM mode or DPFM mode is judged to operate.

As described above, in the DC-DC converter 100, the counter 141 used in both DPWM control and DPFM control. As the result, with relatively simple circuit construction, it is possible to improve the efficiency of DC-DC converter 100 by switching between DPWM control and DPFM control. Further, in the DC-DC converter 100, it is possible to change a switching time difference ΔTs at the time of DPFM control, namely, a switching period Ts. And, in DC-DC converter 100, since the stopping time of counter 141 at the time of DPFM control exists, the power consumption can be suppressed corresponding to the stopping time.

Second Embodiment

Figure 6:
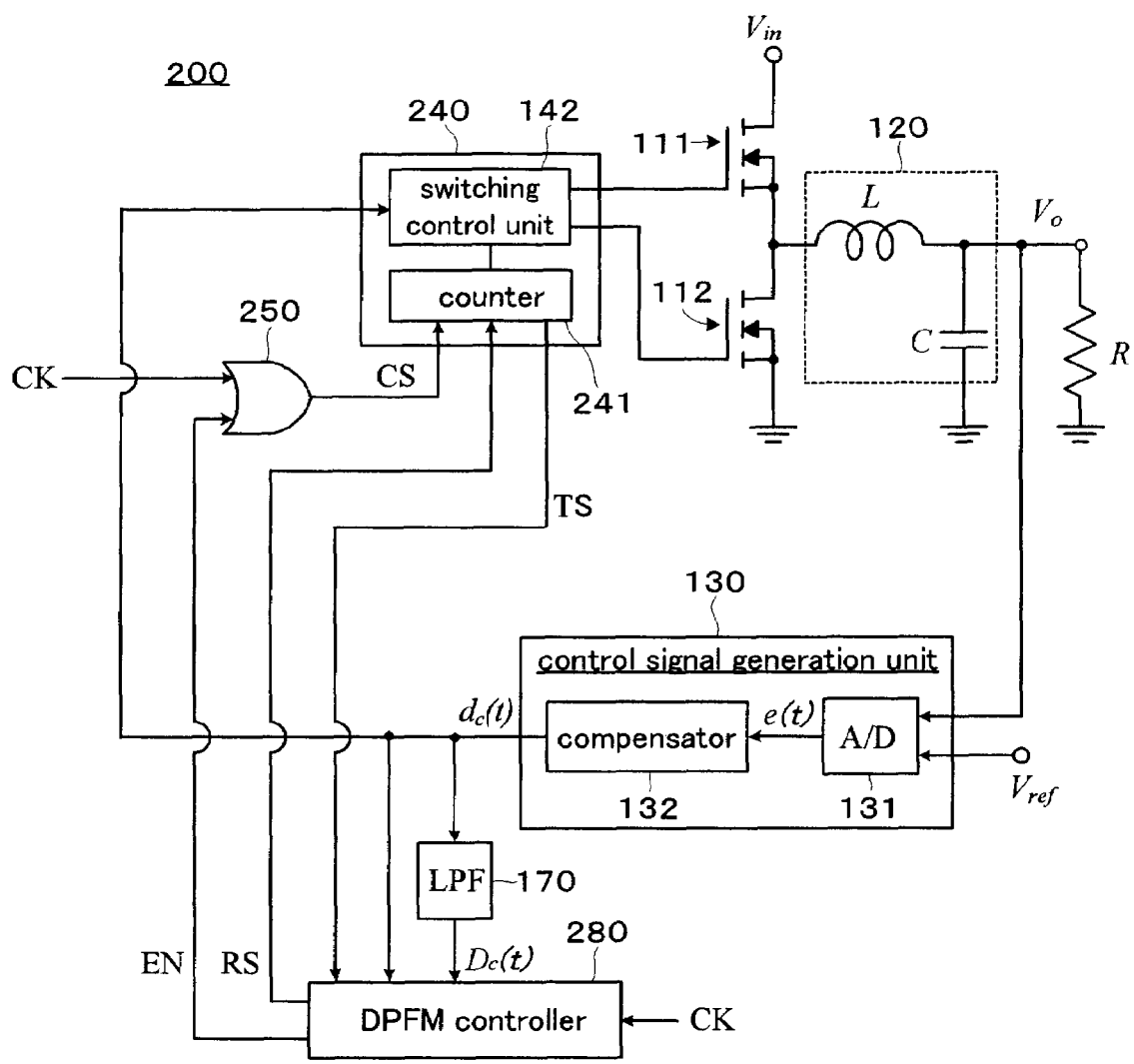
FIG. 6 is a circuit diagram showing a DC-DC converter according to the second embodiment of the invention.

FIG. 6 a circuit diagram showing a DC-DC converter (buck converter) 200 according to the second embodiment. The DC-DC converter 200 comprises FET (Field Effect Transistor) 111, 112, smoothing circuit 120, control signal generation unit 130, DPWM (Digital Pulse Width Modulation) controller 240, OR computing element 250, LPF (Low Pass Filter) 170 and DPFM (Digital Pulse Frequency Modulation) controller 280.

The DPFM controller 280 generates reset signal RS and enable signal EN, based on control signals dc(t), Dc(t) and switching signal TS, clock signal CK. Details thereof will be described later.

(Operation of DC-DC Converter 200)

Figure 7:
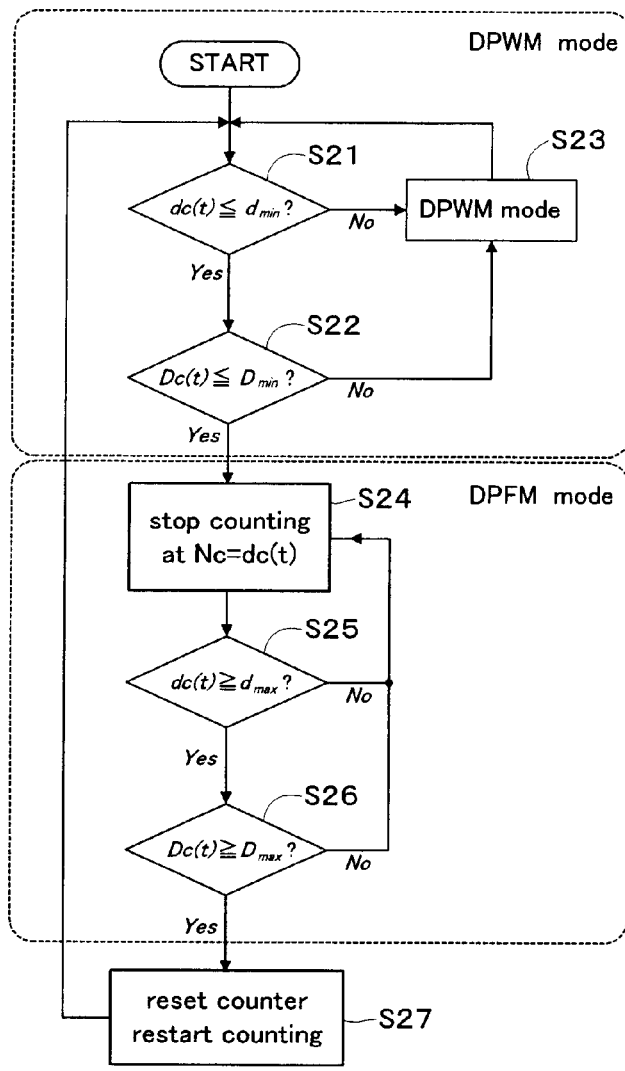
FIG. 7 is a flowchart showing one example of an operation procedure of the DC-DC converter according to the second embodiment of the invention.
Figure 8:
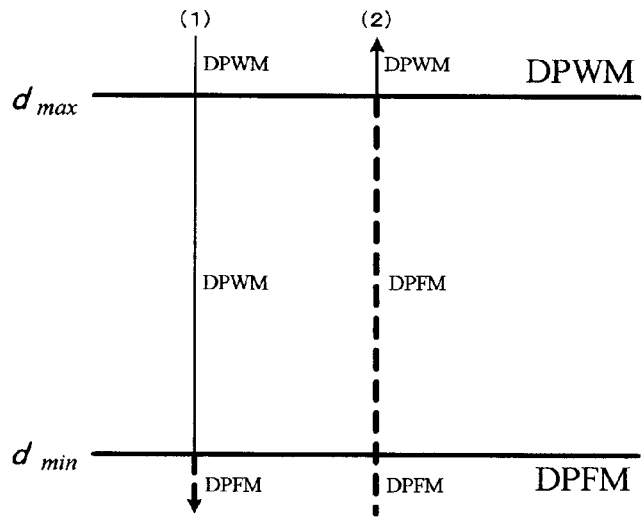
FIG. 8 is a schematic diagram showing the transition of operating state at the operating time of FIG. 7.

FIG. 7 is a flow chart showing the operation processes of the DC-DC converter 200, particularly the DPFM controller 280. And, FIG. 8 is a schematic drawing showing the transition of operation state of the flow chart of FIG. 7. The flow chart in FIG. 7 is different from that of the first embodiment in that steps S25 and S26 are provided instead of step S15 in the first embodiment. Namely, there is a difference of judgment standard which switches from the DPFM control to the DPWM control.

FIG. 8 shows the relation between the control signal dc(t) and the transition of DPWM/DPFM mode. In this FIG. 8, the description of control by the control signal Dc(t) is omitted. The transition from the DPWM mode to the DPFM mode occurs when the value dc(t) becomes smaller than the reference value dmin (step 21). On the other hand, the transition from the DPFM mode to the DPWM mode occurs when the value dc(t) becomes more than or equal to the reference value dmax (step 25). Namely, the reference value dmin at the time of transition from the DPWM mode to the DPFM mode is different from the reference value dmax at the time of transition from the DPFM mode to the DPWM mode (dmax>dmin). Between the reference values dmax and dmin, the previous mode is maintained (a kind of non-sensing zone).

Figures 9, 10:
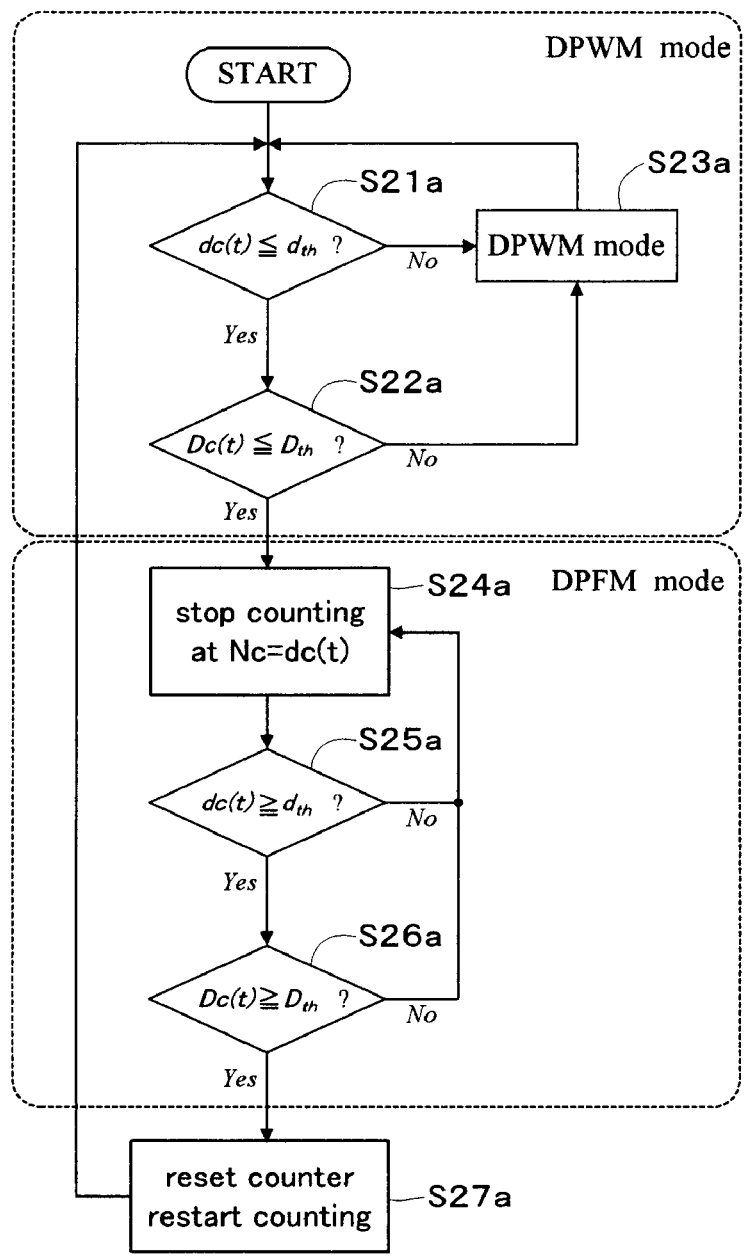
FIG. 9 is a flow chart showing other example of an operation procedure of the DC-DC converter according to the second embodiment of the invention.
FIG. 10 is a schematic diagram showing the transition of operating state at the operating time of FIG. 9.

FIG. 9 is a flow chart showing the other examples of operation processes of the DC-DC converter 200, particularly, DPFM controller 280. FIG. 10 is a schematic drawing showing the transition of operation processes in the flow chart shown in FIG. 9.

Here, respective reference values dth and Dth of respective control signals dc(t) and Dc(t) are a single value. However, if the reference value is single, the transition between DPWN/DPFM modes complicatedly occurs, there is possibility to cause the instability of operation in the DC-DC converter 200. By varying the reference values dmax and dmin depending on the direction of transition, it is possible to suppress the excess transitions between DPWM/DPFM modes, and to conduct the prevention of instability of operation in the DC-DC converter 200. Here, the varying of the reference values depending on the direction of transition is also possible by different operation processes from those shown in FIG. 7.

Figure 11:
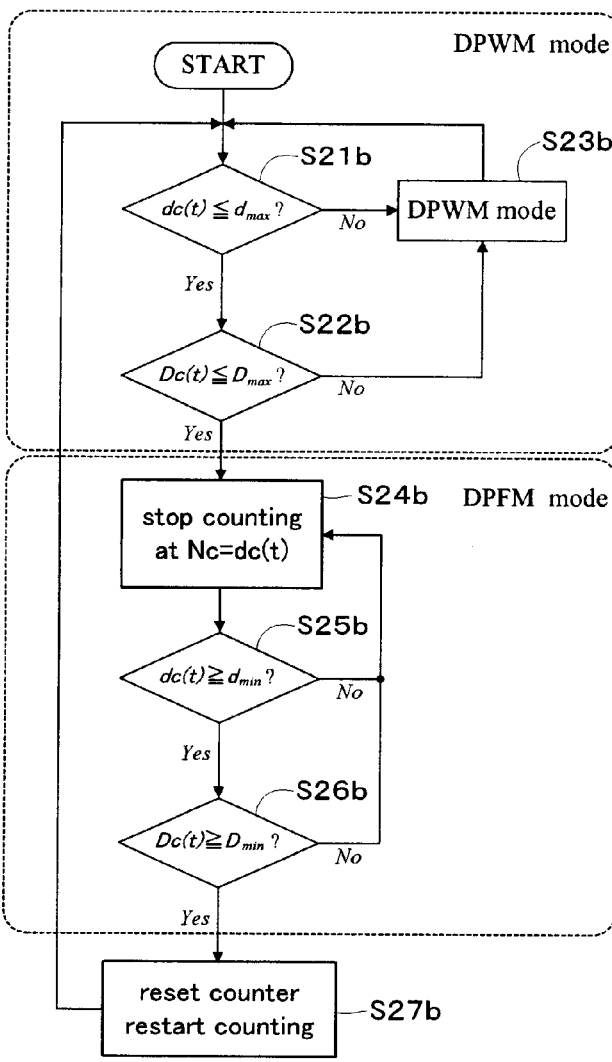
FIG. 11 is a flow chart showing further other example of an operation procedure of the DC-DC converter according to the second embodiment of the invention.
Figure 12:
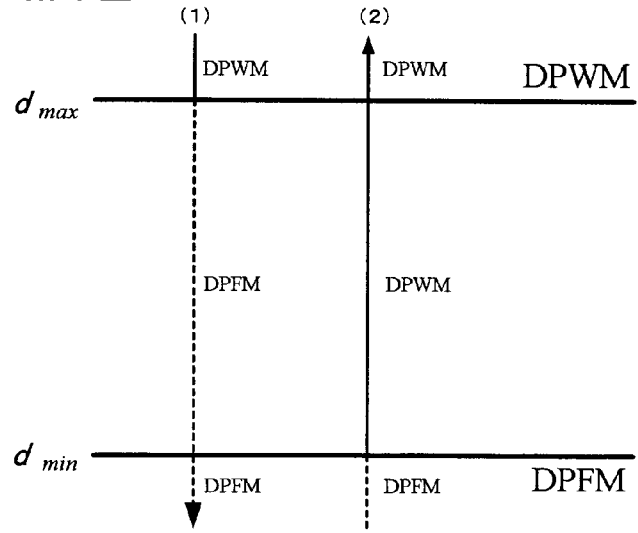
FIG. 12 is a schematic diagram showing the transition of operating state at the operating time of FIG. 11.

FIG. 11 is a flow chart showing other example of the operation processes of DC-DC converter 200, particularly, DPFM controller 280. FIG. 12 is a schematic drawing showing the transition of operation state in the flow chart shown in FIG. 10. In this example, there is no sensible zone between the reference values dmax and dmin. However, in the operation processes, it is possible to suppress the excess transition between the DPWM/DPFM modes, and to prevent the instability of operation of DC-DC converter 200.

Figure 13:
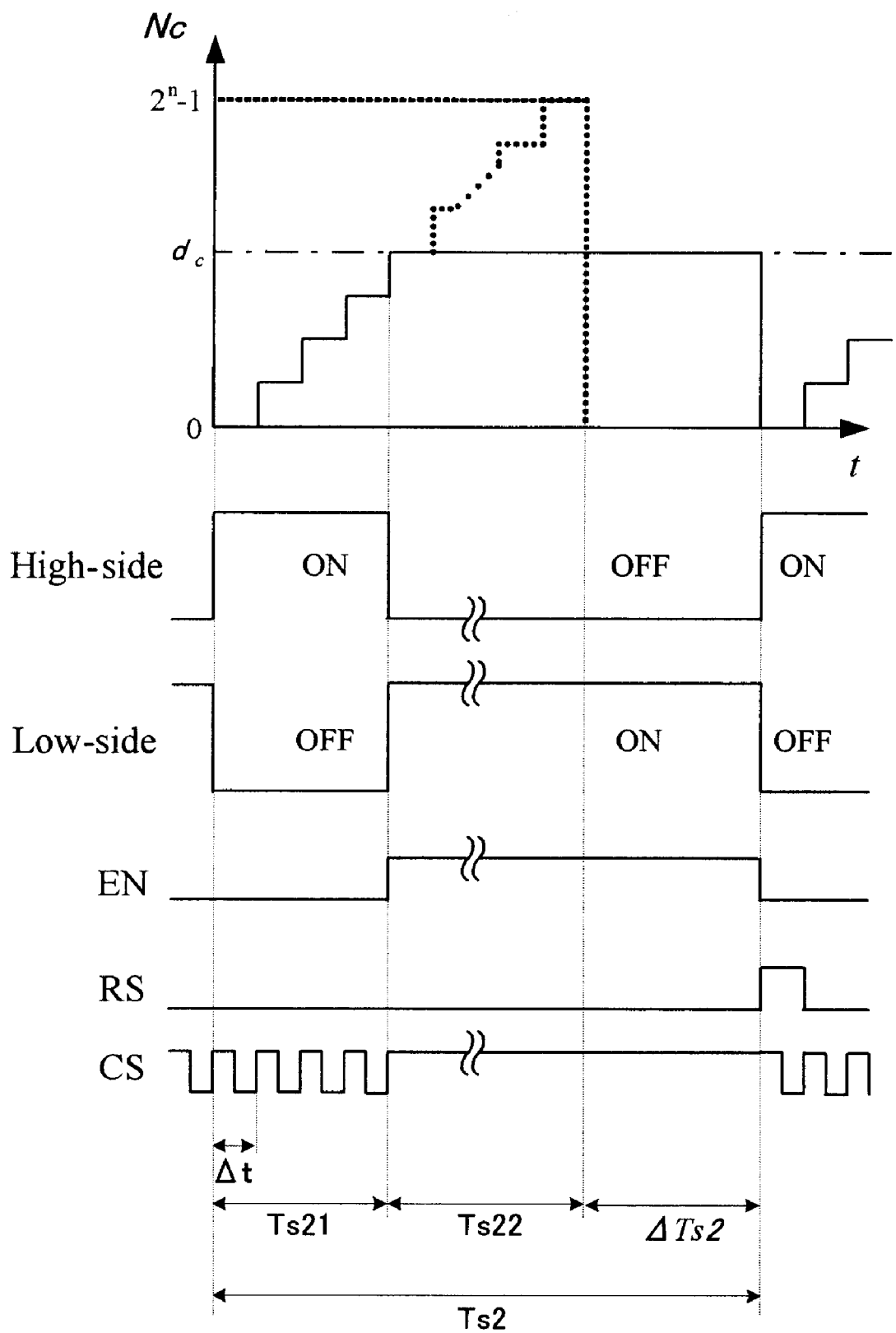
FIG. 13 is a diagram showing an operating wave form at the DPFM control.

FIG. 13 is a diagram showing an operating waveform at DPFM control. The operation wave form at the DPWM control is omitted because that is the same as that of the first embodiment. In the operating wave form of FIG. 13, H/L in the enable signal EN is reversed to that of the first embodiment. Namely the enable signal EN of the present embodiment is H active (High Active) which executes the counting of clock signal CK in L state, and stops the counting of clock signal CK in H state. This corresponds to the using of OR computing element 250 for controlling the counting of clock signal CK. When the enable signal EN is in H state, regardless the state of clock signal CK, the signal CS is always in H state. Since the counter 241 operates with rising up of pulse of input signal CS(edge operation), the counting with the counter 241 is stopped by always maintaining the signal CS in H state.

In the operation wave form shown in FIG. 13, since the state of reset signal RS comes from the H state to the L state, the counting value Nc of counter 241 is set to a minimum counting value, and the counting is restarted. Namely, the reset signal RS of the present embodiment is an H active (High Active). As mentioned above, the reset signal RS is allowed to be both H active (High Active) and L active (Low Active).

Except the above points, the operation wave form at DPFM control time according to the present embodiment is similar to those of the first embodiment.

Further, it is possible to control the stop and start of counting of clock signal CK with the counter, by using an AND computing element instead of the OR computing element 250. In this case, by reversing H/L of enable signal EN, the L active (Low Active) is done similarly to the first embodiment. As known in the above, the operation wave forms shown in FIG. 11 and in FIG. 4 are exchangeable with each other. Except the above, since the present embodiment and the first embodiment are similar, the other explanations are omitted.

Third Embodiment

Figure 14:
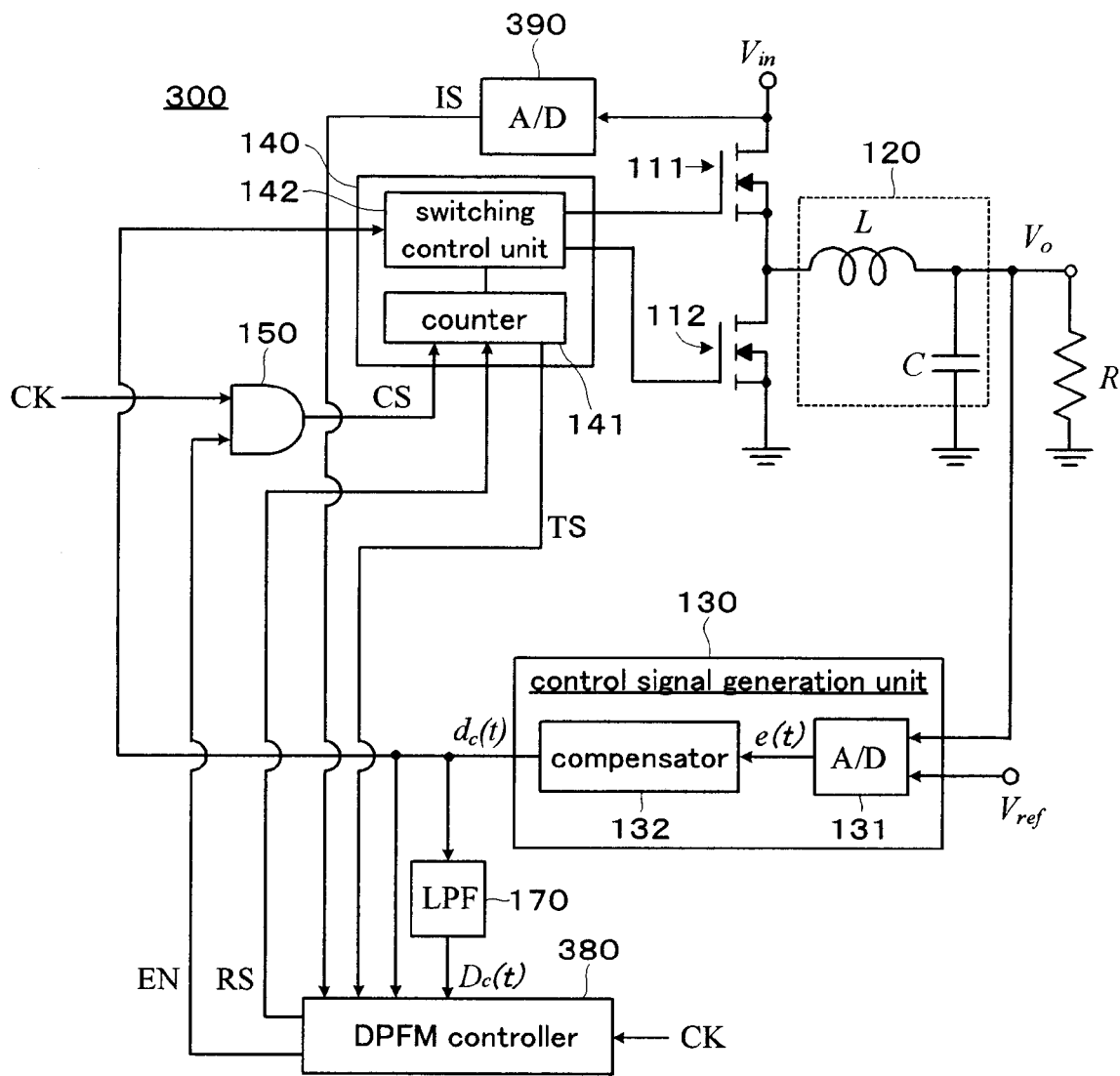
FIG. 14 is a circuit diagram showing a DC-DC converter according to the third embodiment of the invention.

FIG. 14 is a circuit diagram showing a DC-DC converter (buck converter) 300 according to the third embodiment of the invention.

The DC-DC converter 300 comprises FET (Field Effect Transistor) 111, 112, smoothing circuit 120, control signal generation unit 130, DPWM (Digital Pulse Width Modulation) controller 140, AND computing element 150, LPF (Low Pass Filter) 170, DPFM (Digital Pulse Frequency Modulation) controller 380, and voltage detector 390.

The DPFM controller 380 generates a reset signal RS and enable signal EN, based on control signals dc(t) and Dc(t), switching signal TS and clock signal CK, and further, determines reference values dmax, dmin, Dmax and Dmin, based on an input voltage Vin. Namely, the DPFM controller 380 functions as a reference determination unit which determines the first, second, third and fourth reference values. Details thereof will be described later.

The voltage detector 390 outputs the input voltage which is A/D converted to the DPFM controller 380.

(Operation of DC-DC Converter 300)

Figure 15:
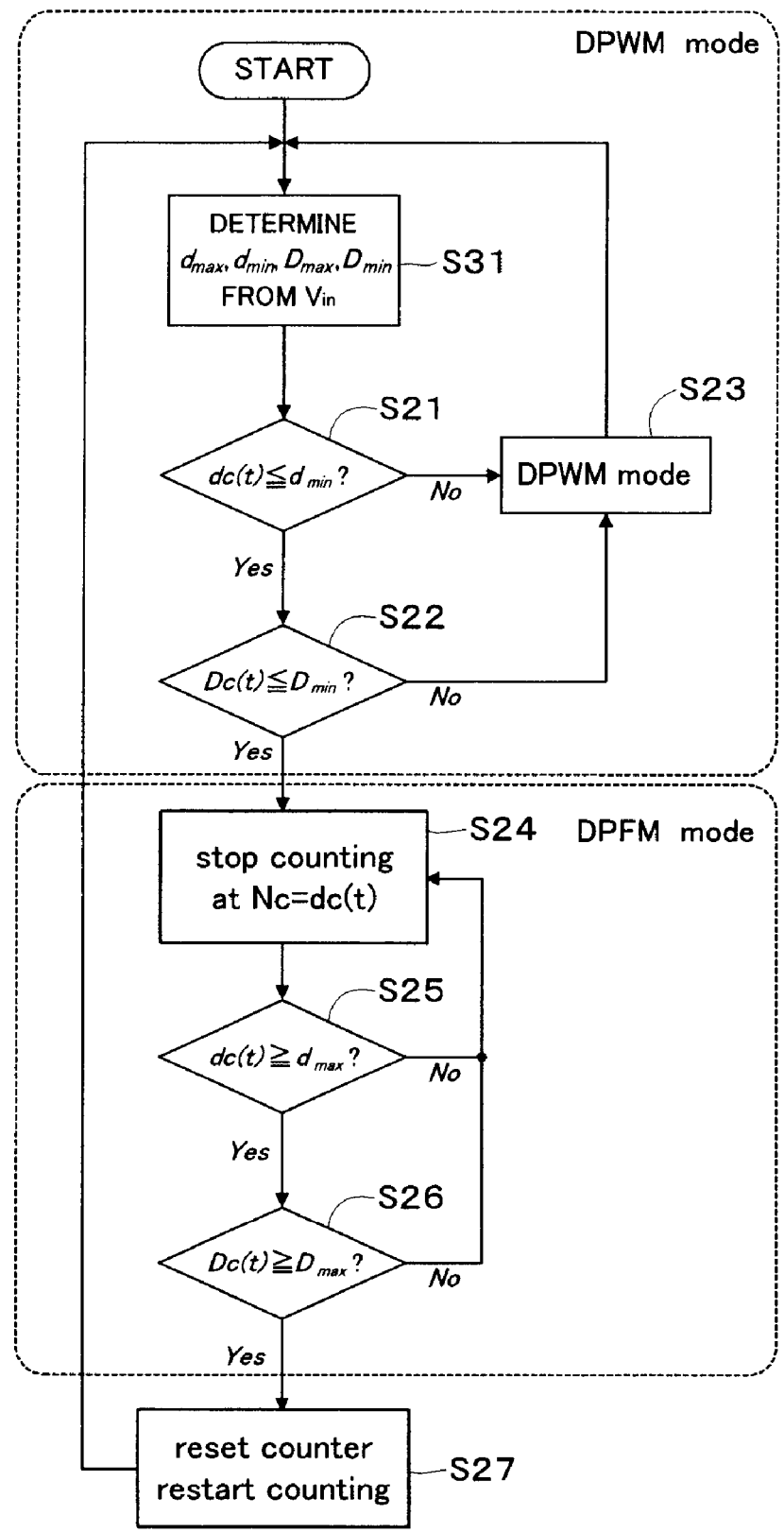
FIG. 15 is a flow chart showing further other example of an operation procedure of the DC-DC converter according to the third embodiment of the invention.

FIG. 15 is a flow chart showing an operation procedure of DC-DC converter, particularly, DPFM controller 380.

The flow chart shown in FIG. 15 is different from that of the second embodiment with respect to an adding step S31. This is for corresponding to the variation of input voltage Vin. When the input voltage Vin is varied, a value dc is varied. For example, the input voltage Vin is lower than a nominal voltage, the time that FET 111 at high-voltage side comes to ON is lengthened. Thus, the value dc becomes larger. Due to this, it is desirable to control the reference values dmax, dmin, Dmax, and Dmin corresponding to the variation of the input voltage Vin.

The reference values Dmax, dmin, Dmax, and Dmin corresponding to the input voltage Vin are memorized in a table. With reference to the table, the DPFM controller 380 determines reference values dmax, dmin, Dmax and Dmin corresponding to detected input voltage Vin with the voltage detector 390. Except this point, the present embodiment is similar to the second embodiment. Therefore, detailed description is omitted.

Fourth Embodiment

Figure 16:
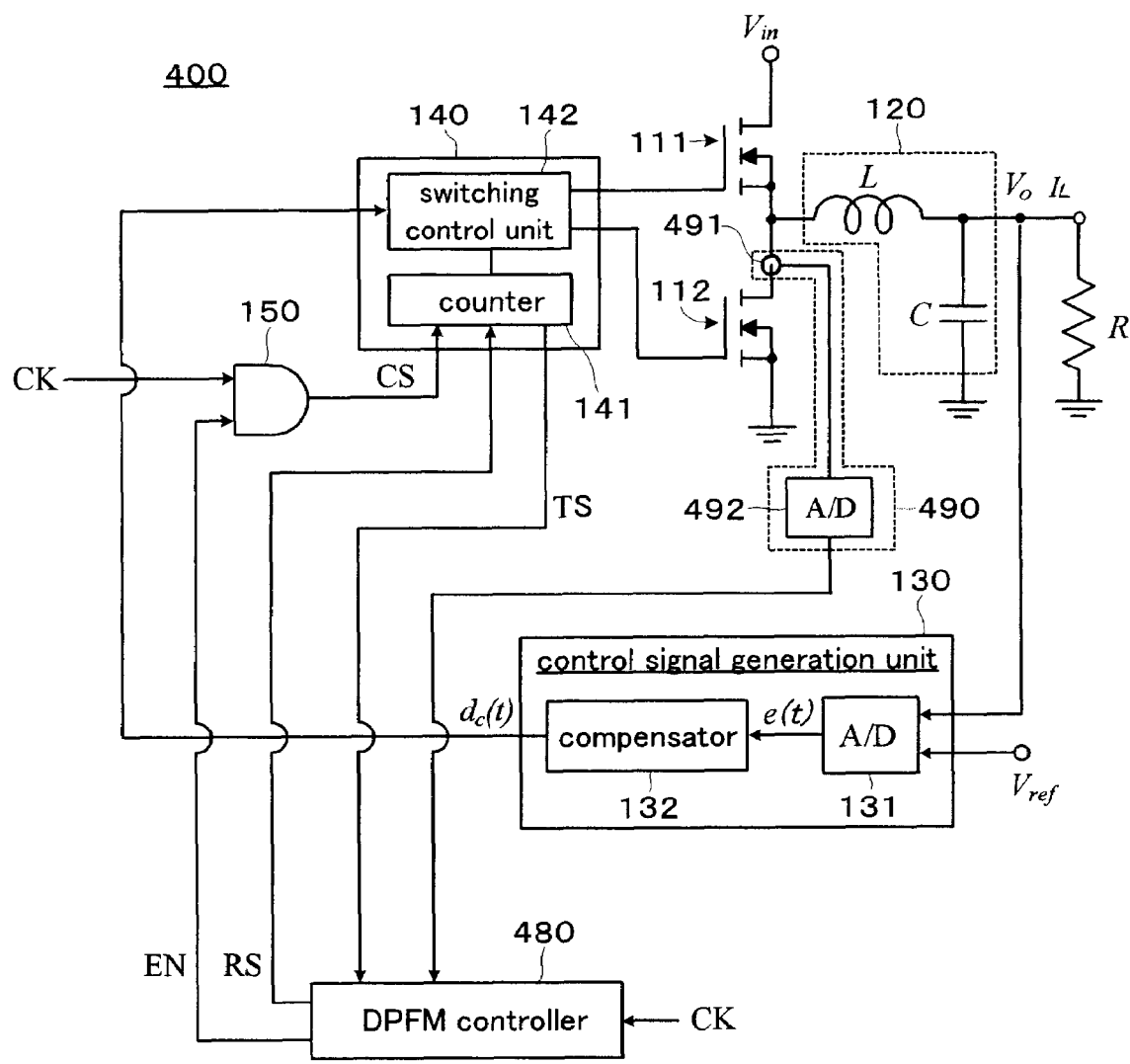
FIG. 16 is a circuit diagram showing a DC-DC converter according to the fourth embodiment of the invention.

FIG. 16 is a circuit diagram showing a DC-DC converter (buck converter) 400 according to the fourth embodiment of the invention.

The DC-DC converter 400 comprises FET (Field Effect Transistor) 111, 112, smoothing circuit 120, control signal generation unit 130, DPWM (Digital Pulse Width Modulation) controller 140, AND computing element 350, DPFM (Digital Pulse Frequency Modulation) controller 480, and voltage detector 490.

The DPFM controller 480 generates a reset signal RS and enable signal EN, based on current $I_{low}$, switching signal TS and clock signal CK. Detail will be described later.

A current determining detector 490 provides a detector body 491 and A/D converter 492.

The detector body 491 detects the current $I_{low}$ which passes through the FET 112 at low voltage side. The A/D converter 492 A/D-converts the current $I_{low}$ detected by the detector body 491 and outputs to the DPFM controller 480.

(Operation of DC-DC Converter 400)

Figure 17:
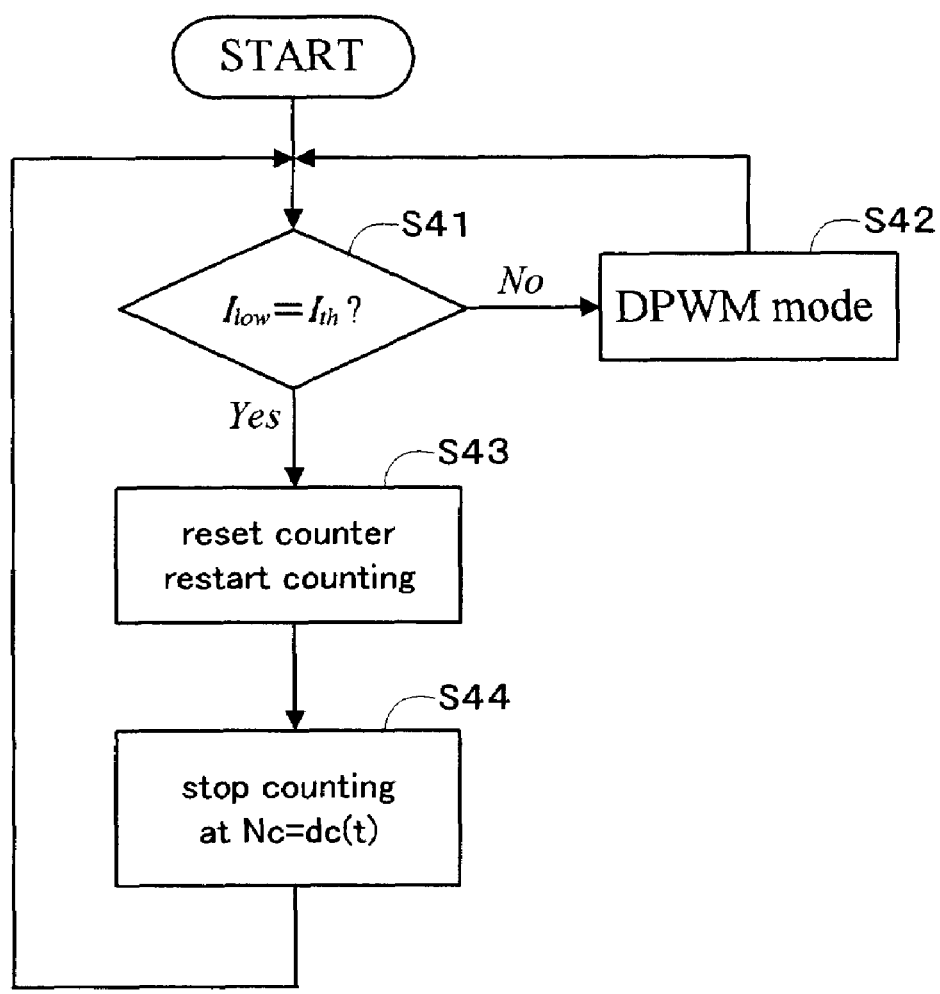
FIG. 17 is a flow chart showing an operation procedure of the DC-DC converter according to the fourth embodiment of the invention.
Figure 18:
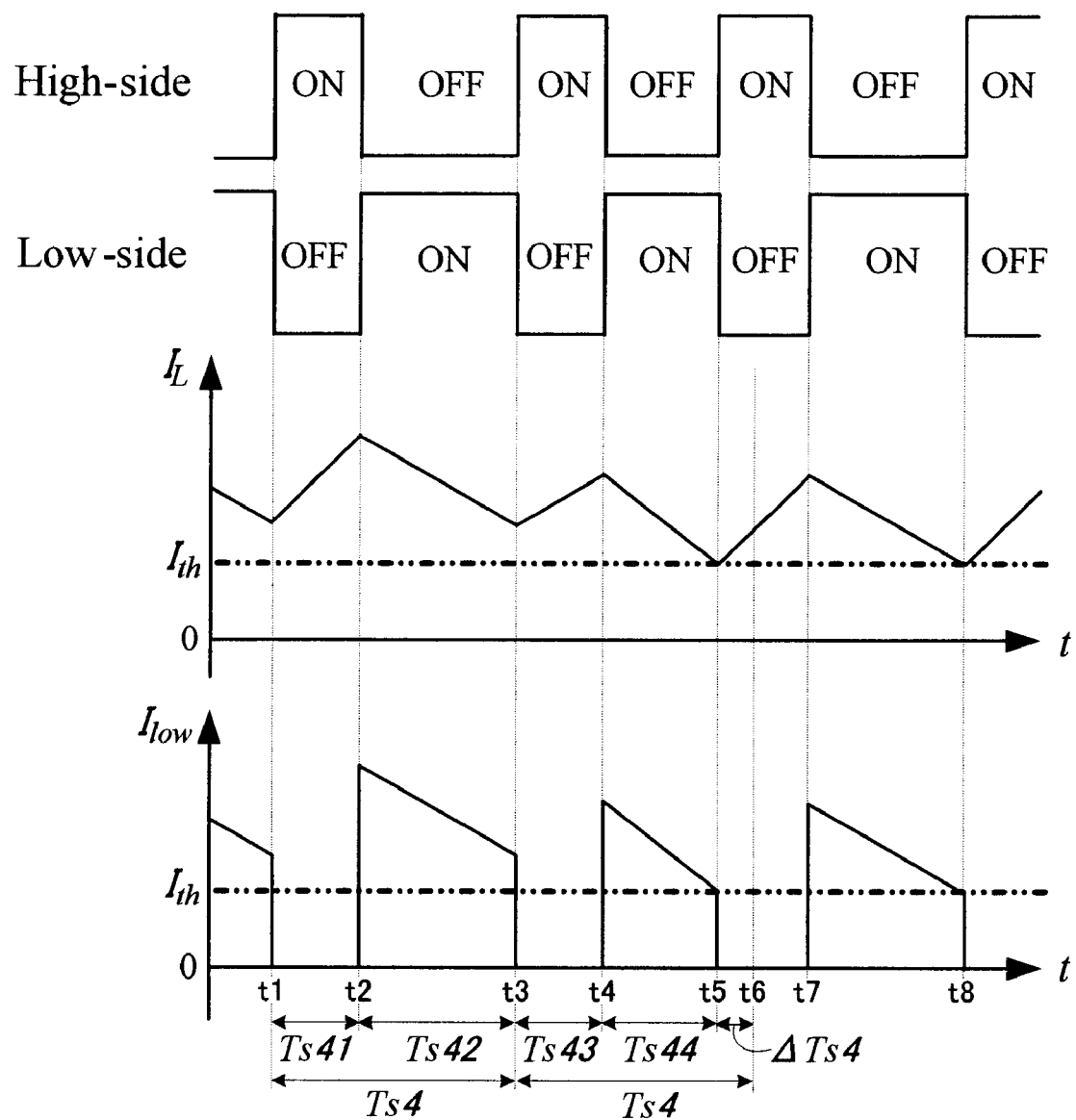
FIG. 18 is a diagram showing an operating wave form at the DPFM control.

FIG. 17 is a flow chart showing an operation procedure of DC-DC converter 400, particularly, DPFM controller 480. And FIG. 18 is an operation wave form diagram at the time of DPFM control.

Here, FIG. 16 shows a current $I_{low}$ at FET 112, and a current IL at load R. The current $I_{low}$ at FET 112 flows only at the time of ON state of FET 112, and does not flow at the time of OFF state of FET 112. The current $I_{high}$ at FET 111 flows only at the time of ON state of FET 111, and does not flow at the time of OFF state of FET 111.

Further the current IL at load R is the sum of currents $I_{high}$ and $I_{low}$. At the ON state of FET 111, the current IL is equal to the current $I_{high}$ and at the ON state of FET 112 the current IL is equal to the current $I_{low}$.

(1) Judge that the current $I_{low}$ detected at the detector body 491 is equal to the reference value Ith or not (step S41).

1) If the current $I_{low}$ is not equal to the reference value Ith, the DC-DC converter 100 operates with the DPWM mode (step S42 before the time t5 of FIG. 18).

By the control signal generation unit 130, FET 111 and FET 112 are alternatively switched from ON to OFF. Accompanying with the switching ON/OFF, the current IL is changed. When the FET 111 is at ON state, the current IL increases. When the FET 112 is at ON state, the current IL decreases (at this time, IL=$I_{low}$).

Even if the current $I_{low}$ is changed, if it is not equal to the reference value Ith, the DPWM mode is maintained. As described later, since the current $I_{low}$ is controlled not to be smaller than the reference value Ith, in this case the current $I_{low}$ is larger than the reference value Ith.

The reference value Ith can be a fixed value. And it is also allowed to prepare a table which represents a correspondence relation between the input voltage Vin and the reference value Ith. In this case, the reference value Ith is determined by detecting the input voltage Vin and referring the table.

2) When the current $I_{low}$ is equal to the reference value Ith, the counter 141 is reset and the counting is restarted (step S43, time t5 in FIG. 18).

At just before the time t5, FET 112 is in ON state. When FET 111 is in ON state, the current $I_{low}$ is 0. Therefore, the current $I_{low}$ can not be equal to the reference value Ith (the reference value Ith is set to be larger than 0).

By the resetting of counter 141, the FET 111 is in ON state (high voltage side (High-side): ON, low voltage side (Low-side): OFF). At the time of PWM control, the FET 112 is in ON-state before period ΔTs from the time t2 in which FET 112 is in ON-state. In this case, the ON/Off period Ts of FET111 and FET 112 is shortened by period ΔTs4.

(2) When a counting value Nc of counter 141 becomes equal to the expression value Ndc, the counting with the counter 141 is stopped (step S44, time t7).

By making the enable signal NE in L state, it is possible that the counting with the counter 141 is stopped and the consumption of power is decreased. At this time, due to the control signal generation unit 130, the FET 112 at low voltage side is in ON state. Thereafter, at the time in which the current $I_{low}$ is equal to the reference value Ith, FET 111 comes to the state of ON (step S41, S42, time t8).

Fifth Embodiment

Figure 19:
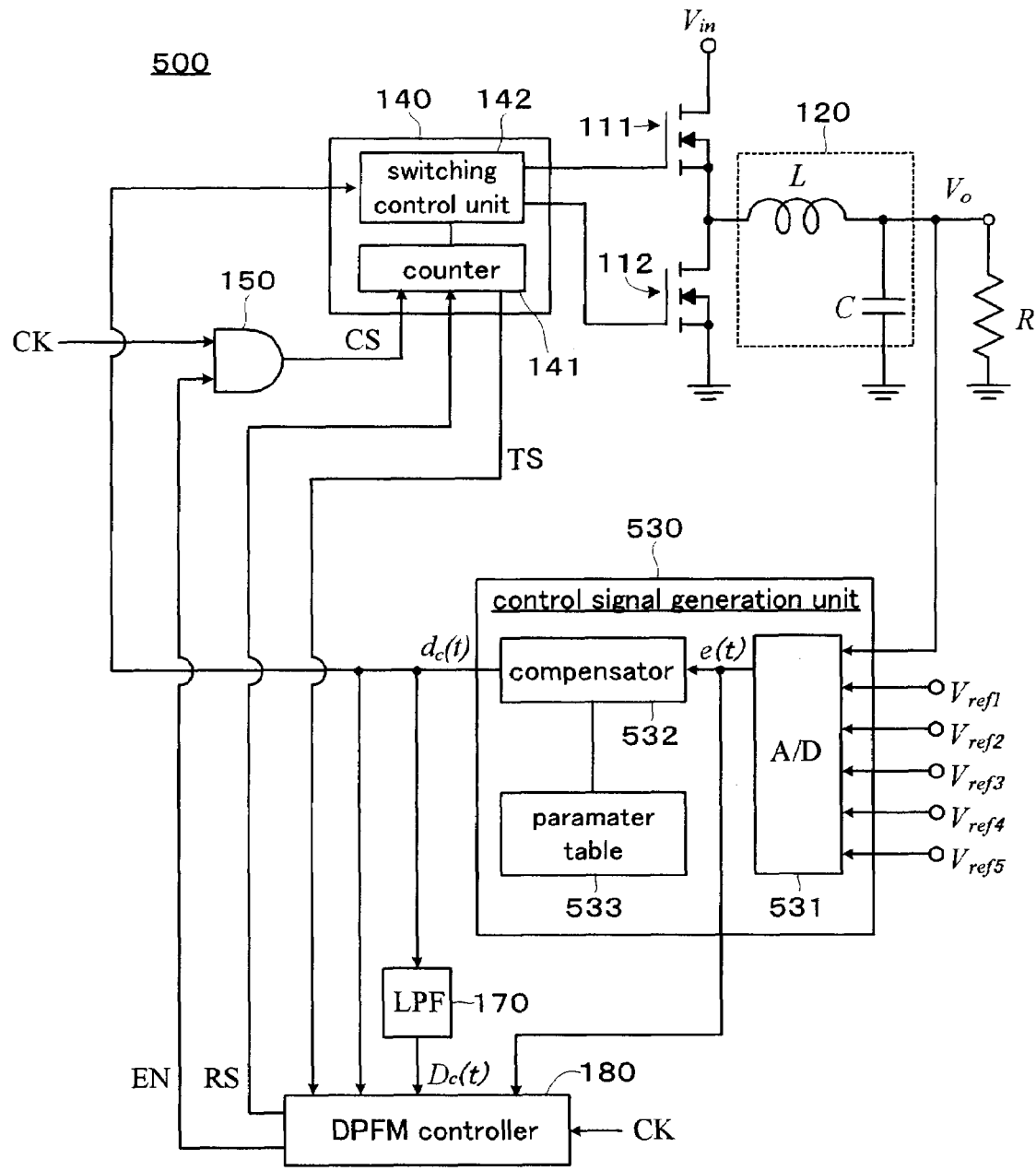
FIG. 19 is a circuit diagram showing a DC-DC converter according to the fifth embodiment of the invention.

FIG. 19 is a circuit diagram showing a DC-DC converter (buck converter) 500 according to the fifth embodiment of the invention. The DC-DC converter 500 comprises FET (Field Effect Transistor) 111, 112, smoothing circuit 120, control signal generation unit 530, DPWM (Digital Pulse Width Modulation) controller 140, AND computing element 150, LPF 170, and DPFM (Digital Pulse Frequency Modulation) controller 180.

The control signal generation unit 530 has a differentiator 531, compensator 532 and parameter table 533, and generates a control signal dc(t).

The differentiator 531 generates a differential signal e(t) which represents the difference between either of reference voltage Vref1 to Vref5 and an output voltage Vo(t). Namely, it is possible to select a reference voltage between Vref1 to Vref5, and to control the output voltage Vo(t) to correspond the selected reference voltage.

Further, the selection of the reference voltage can be realized by both hardware and software. For example, by adding a switch for switching the reference voltage to the DC-DC converter 500, it is possible to select the reference voltage by user.

The compensator 532 generates a control signal dc(t) based on the differential signal e(t). At this time, based on the differential signal e(t) control parameters (for example, constants A1 to C1, A2 and B2 in expressions (2) and (3)) are changed. For this changing, a parameter table 533 is used. Since the parameters are changed corresponding to the differential signal e(t), more precision control of output voltage Vo becomes possible.

The parameter table 533 memorizes control parameters of the compensator 532. For example, it memorizes values (or range thereof) of differential signal e(t) and control parameters with correspondence.

As described above, in the present embodiment, it is possible to the selection of reference voltage and the change of control parameter. Except these points, the present embodiment is similar to the first embodiment. Thus, the explanation thereof is omitted. Further, the construction in the present embodiment can be applied to other embodiments except the first embodiment. Furthermore, it is allowed to apply either one of the selection of reference voltage and the change of control parameter.

Sixth Embodiment

Figure 20:
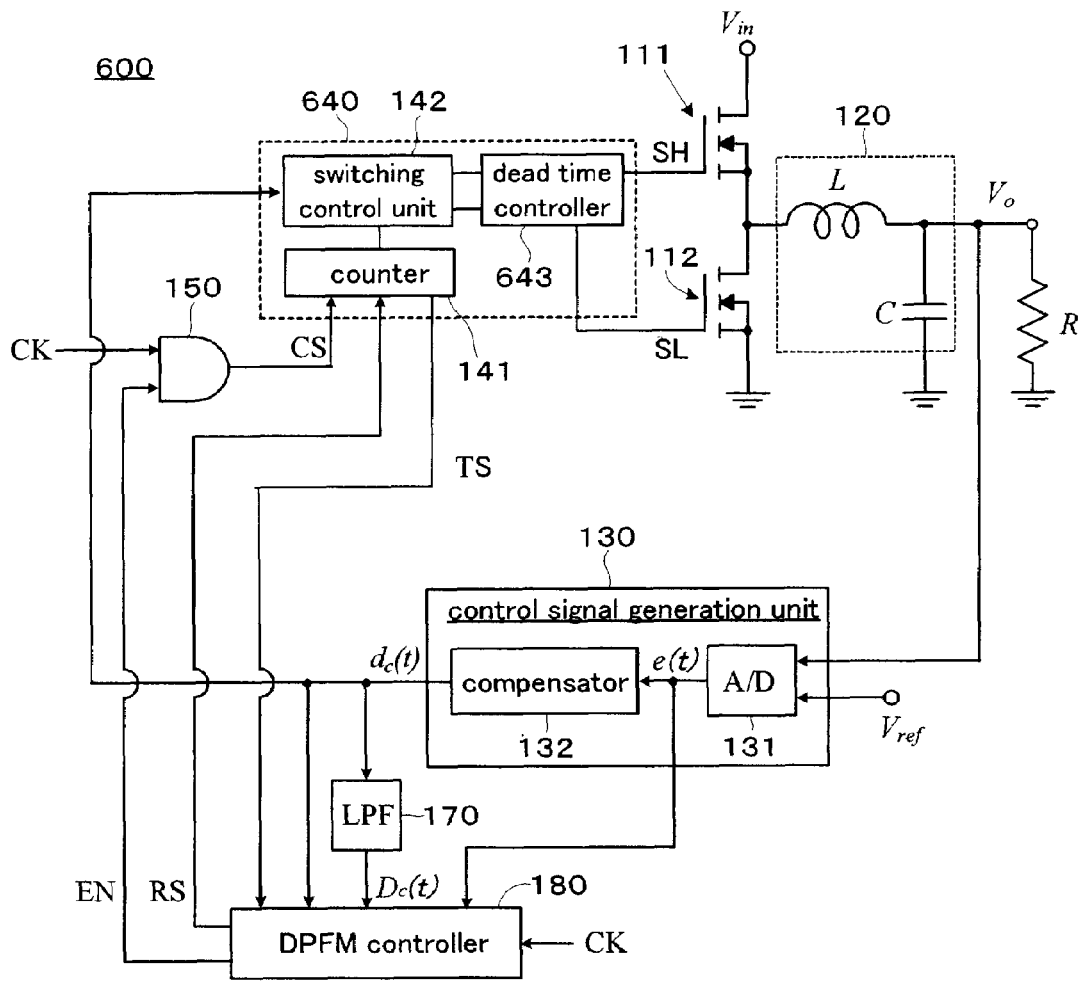
FIG. 20 is a circuit diagram showing a DC-DC converter according to the sixth embodiment of the invention.

FIG. 20 is a circuit diagram showing a DC-DC converter 600 according to the fifth embodiment of the invention. The DC-DC converter 600 comprises FETS 111 and 112, a smoothing circuit 120, a control signal generation unit 530, a DPWM controller 640, an AND computing element 150, a LPF 170, and a DPFM controller 180.

The DPWM controller 640 has a counter 141, a switching control unit 142, and a dead-time controller 643 and controls the DPWM.

Figure 21:
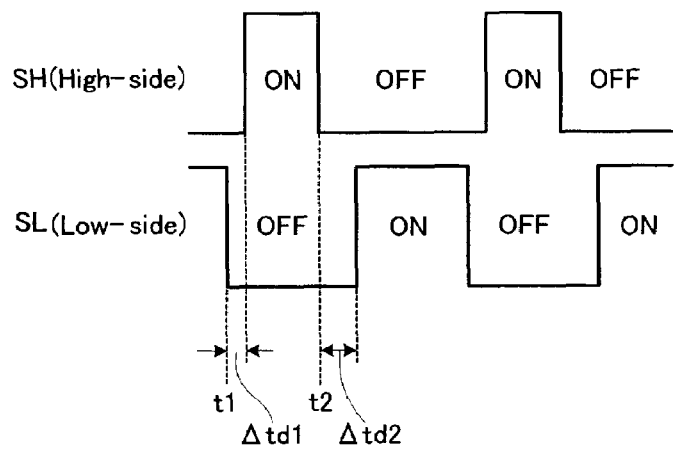
FIG. 21 is a timing chart showing a voltage wave form outputting from DPWM controller according to the sixth embodiment of the invention.

FIG. 21 is corresponding to a part of FIG. 4 and shows voltage waveform SH and SL outputted from the DPWM controller 640. As shown in FIG. 21, the signals SH and SL change H/L state at different times (having time lags Δtd1 and Δtd2). And FIG. 21 is different from FIG. 4 at the point. Within the period Δtd1 and Δtd2, both of FETs 111 and 112 are in OFF state. Namely, these period Δtd1 and Δtd2 means dead times in which both of FETs 111 and 112 do not operate. Operating efficiencies of FETs 111 and 112 can be increase by using dead time.

The dead-time controller 643 generates and controls the period Δtd1 and Δtd2. The signal outputted from the switching control unit 142 is switched at the time t1 and t2. At the time t1, FET 112 becomes to be OFF state. At the time t2, FET 111 becomes to be OFF state. The dead-time controller 643 makes the signal SH to be ON state after the period Δt1 from the time t1. The dead-time controller 643 makes the signals SL to be ON state after the period Δt2 from the time t2.

Other Embodiments

The embodiments of the present invention can be extended and modified without restriction by the above embodiments. The extended and modified embodiments are included within a technical scope of the invention.

In the above embodiments, it is described that the step-down type DC-DC converter (buck converter). However, the invention is not limited to the above. In the other DC-DC converters, it is also possible to apply the invention and to have a similar effect as the present invention. For example, the application to the step-up type DC-DC converter can be is considered. To reverse an FET 111 to a coil L and supply an input voltage Vin to the coil L. Thus, since the coil L functions as a choke coil, it is possible to obtain higher voltage as the output voltage Vo than the input voltage Vin.

In the above embodiment, the signal CS inputted to the counter 141 is controlled by AND computing and OR computing between clock signal CK and enable signal EN. Instead of this, it may be possible to stop or restart the counting with the counter 141 by inputting the signal to the counter 141 itself.

What is claimed is:

1. A switching power circuit, comprising:
   a determining unit which continuously determines a third value between a first value and a second value, based on a voltage difference between an output voltage and a reference voltage;
   a PWM control unit having a counter to periodically count a value between the first value and the second value and a driving unit which alternately switches a first switching element and a second switching element, the PWM control unit switching the first switching element and the second switching element in pulse width modulation mode, based on a small and large relation between a counting value of the counter and the third value; and
   a PFM control unit to switch the first switching element and the second switching element in pulse frequency modulation mode based on any one of the third value, a fourth value generated by averages of the third value, and a current value at the second switching element.

2. The switching power circuit according to claim 1, wherein the first and second switching elements are connected in series with each other.

3. The switching power circuit according to claim 2, further comprising
   a smoothing circuit which has one end connected to at least one of the first and second elements and another end which outputs the output voltage.

4. The switching power circuit according to claim 1, wherein the determining unit has a differentiator which generates a differential signal representing a difference between the output voltage and the reference voltage, and a compensator which generates a control signal representing the third value from the differential signal.

5. The switching power circuit according to claim 1, wherein the counter counts clock signal.

6. The switching power circuit according to claim 1, wherein the PFM control unit resets a counting value of the counter to the first value based on a small and large relation between the counting value of the counter and the third value, and the voltage difference.

7. The switching power circuit according to claim 1, further comprising
   an averaging unit which averages the third value to generate the fourth value, wherein the PFM control unit resets the counting value of the counter to the first value, based on at least either of the third and fourth values, a small and large relation between the counting value of the counter and the third value, and the voltage difference.

8. The switching power circuit according to claim 7, wherein the averaging unit has a low pass filter.

9. The switching power circuit according to claim 7, wherein the PFM control unit has a count stop unit which stops the counting with the counter when the third value is more than or equal to a first reference value or when the fourth value is more than or equal to a second reference value; and
   a count restart unit which restarts the counting with the counter in corresponding to the reset of the counter.

10. The switching power circuit according to claim 1, further comprising
    an averaging unit which averages the third value to generate a fourth value, wherein the PFM control unit resets the counting values of the counter to the first value, based on at least either the third value and the fourth value, and a small and large relation between the counting value of the counter and the third value.

11. The switching power circuit according to claim 10, wherein the PFM control unit resets the counting value of the counter to the first value, based on the small and large relation between the third value and a first reference value, the small and large relation between the fourth value and a second reference value, and the small and large relation between the counting value of the counter and the third value.

12. The switching power circuit according to claim 11, wherein the PFM control unit has a count stop unit which stops the counting with the counter when the third value is more than or equal to the first reference value or when the fourth value is more than or equal to the second reference value; and
    a count restart unit which restart the counting with the counter being stopped, in corresponding to the reset of the counter.

13. The switching power circuit according to claim 12, further comprising
    a reference value determining unit which determines the first, second, third and fourth reference values based on an input voltage.

14. The switching power circuit according to claim 1, wherein the PFM control unit reset the counting value of the counter to the first value, based on a small and large relation between the current value and a reference value.

15. The switching power circuit according to claim 14, wherein the PFM control unit has a count stop unit which stops the count with the counter when the current value is equal to the reference value; and
    a count restart unit which restarts a count with the counter being stopped, in corresponding to the reset of the counter.

16. The switching power circuit according to claim 1, wherein the driving unit alternately switches the first switching element and the second switching element via a state where both of the first switching element and the second switching element are OFF.

17. A power control method, comprising:
    periodically counting a value between a first value and a second value by a counter;
    continuously determining a third value between the first value and the second value, based on a voltage difference between an output voltage and a reference voltage;
    alternately switching a first switching element and a second switching element in pulse width modulation mode, based on a small and large relation between a counting value of the counter and the third value; and
    alternately switching the first switching element and the second switching element in pulse frequency modulation mode, based on any one of the third value, a fourth value generated by averages of the third value, and a current value at the second switching element.

18. The power control method according to claim 17, wherein the determining step has generating a differential signal representing a difference between the output voltage and the reference voltage, and generating a control signal representing the third value from the differential signal.

19. The power control method according to claim 17, further comprising
    resetting the counting value of the counter to the first value based on a small and large relation between the counting value of the counter and the third value, and the voltage difference.

* * * * *